(12) United States Patent
Lee et al.

(10) Patent No.: US 11,893,698 B2
(45) Date of Patent: Feb. 6, 2024

(54) ELECTRONIC DEVICE, AR DEVICE AND METHOD FOR CONTROLLING DATA TRANSFER INTERVAL THEREOF

(71) Applicant: SAMSUNG ELECTRONICS CO., LTD., Suwon-si (KR)

(72) Inventors: Seungbum Lee, Suwon-si (KR); Seungseok Hong, Suwon-si (KR); Donghyun Yeom, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 91 days.

(21) Appl. No.: 17/645,825

(22) Filed: Dec. 23, 2021

(65) Prior Publication Data

US 2022/0139053 A1 May 5, 2022

Related U.S. Application Data

(63) Continuation of application No. PCT/KR2021/015947, filed on Nov. 4, 2021.

(30) Foreign Application Priority Data

Nov. 4, 2020 (KR) .................. 10-2020-0145661

(51) Int. Cl.
G06T 19/00 (2011.01)
H04W 4/00 (2018.01)
G02B 27/01 (2006.01)

(52) U.S. Cl.
CPC .......... *G06T 19/006* (2013.01); *G02B 27/017* (2013.01); *G06T 19/003* (2013.01); *H04W 4/00* (2013.01); *G02B 2027/0178* (2013.01)

(58) Field of Classification Search
None
See application file for complete search history.

(56) References Cited

U.S. PATENT DOCUMENTS 6,061,068 A * 5/2000 Hoffman ................. G06T 15/00
345/619
6,118,456 A * 9/2000 Cooper ................... G06T 15/40
345/619

(Continued)

FOREIGN PATENT DOCUMENTS

KR 10-2011-0004940 1/2011
KR 10-1287251 7/2013

(Continued)

OTHER PUBLICATIONS

Search Report and Written Opinion dated Feb. 11, 2022 in counterpart International Patent Application No. PCT/KR2021/015947.

*Primary Examiner* — Martin Mushambo
(74) *Attorney, Agent, or Firm* — Nixon & Vanderhye P.C.

(57) ABSTRACT

An electronic device according to various embodiments of the disclosure includes: a communication module comprising communication circuitry and a processor operatively connected to the communication module. The processor may be communicatively connected to an augmented reality (AR) device through the communication module, and be configured to receive image information obtained by a camera of the AR device from the AR device, to detect an object based on the received image information, to acquire virtual information corresponding to the object, to control the communication module to transmit the virtual information to the AR device, to determine, based on the received image information, whether the object is out of a viewing range of the AR device, and to change a transfer interval of the virtual information for the AR device based on the determination.

18 Claims, 13 Drawing Sheets

(56) References Cited

U.S. PATENT DOCUMENTS

| | | | | |
|---|---|---|---|---|
| 6,621,600 B1* | 9/2003 | Boyd | | H04N 1/0455 |
| | | | | 348/203 |
| 8,838,730 B2* | 9/2014 | Ishii | | G09B 5/00 |
| | | | | 709/227 |
| 9,851,787 B2 | 12/2017 | Latta et al. | | |
| 11,334,960 B2* | 5/2022 | Totolos, Jr. | | G01S 17/931 |
| 2004/0004627 A1* | 1/2004 | Ohki | | H04N 19/94 |
| | | | | 345/698 |
| 2007/0146391 A1* | 6/2007 | Pentenrieder | | G06T 7/80 |
| | | | | 345/633 |
| 2007/0182739 A1* | 8/2007 | Platonov | | G06T 7/564 |
| | | | | 345/427 |
| 2009/0096811 A1* | 4/2009 | Tanaka | | G02F 1/1313 |
| | | | | 248/176.1 |
| 2009/0267948 A1* | 10/2009 | Finn | | G06T 19/00 |
| | | | | 345/473 |
| 2010/0002006 A1* | 1/2010 | Mauchly | | H04N 13/398 |
| | | | | 345/581 |
| 2011/0205042 A1* | 8/2011 | Takemura | | B60W 30/08 |
| | | | | 340/435 |
| 2011/0234791 A1* | 9/2011 | Miyashita | | G06F 3/011 |
| | | | | 348/139 |
| 2011/0310120 A1* | 12/2011 | Narayanan | | G06F 3/04842 |
| | | | | 345/633 |
| 2012/0162549 A1 | 6/2012 | Gao et al. | | |
| 2013/0117377 A1* | 5/2013 | Miller | | G06F 16/954 |
| | | | | 709/205 |
| 2013/0265330 A1* | 10/2013 | Goto | | G02B 27/0172 |
| | | | | 345/632 |
| 2013/0318260 A1* | 11/2013 | Watabe | | G06F 5/12 |
| | | | | 710/53 |
| 2014/0111543 A1* | 4/2014 | Kim | | G09G 3/001 |
| | | | | 345/633 |
| 2014/0145914 A1* | 5/2014 | Latta | | G06F 3/013 |
| | | | | 345/8 |
| 2014/0306866 A1* | 10/2014 | Miller | | G06T 7/73 |
| | | | | 345/8 |
| 2014/0349683 A1* | 11/2014 | D'Argenio | | H04N 21/4126 |
| | | | | 455/456.3 |
| 2014/0375683 A1* | 12/2014 | Salter | | G06T 19/006 |
| | | | | 345/633 |
| 2015/0070389 A1* | 3/2015 | Goto | | G06T 7/00 |
| | | | | 345/633 |
| 2015/0116355 A1* | 4/2015 | Hofmann | | G06V 20/20 |
| | | | | 382/103 |
| 2015/0130823 A1* | 5/2015 | Kim | | G09G 5/18 |
| | | | | 345/82 |
| 2015/0228216 A1* | 8/2015 | Lee | | G09G 3/20 |
| | | | | 345/691 |
| 2015/0235424 A1* | 8/2015 | Wang | | G06T 19/006 |
| | | | | 345/633 |
| 2015/0332505 A1* | 11/2015 | Wang | | G06T 19/006 |
| | | | | 345/633 |
| 2015/0363653 A1* | 12/2015 | Kashiwai | | G06T 7/73 |
| | | | | 348/148 |
| 2016/0026253 A1* | 1/2016 | Bradski | | H04N 13/128 |
| | | | | 345/8 |
| 2016/0112479 A1* | 4/2016 | Jayaraj | | H04L 65/4015 |
| | | | | 345/633 |
| 2016/0150212 A1* | 5/2016 | Moura | | H04N 13/167 |
| | | | | 375/240.02 |
| 2016/0180593 A1* | 6/2016 | Yang | | G06T 17/00 |
| | | | | 345/419 |
| 2017/0043256 A1* | 2/2017 | Severn | | A63F 13/213 |
| 2017/0091953 A1* | 3/2017 | Bleiweiss | | G06V 20/52 |
| 2017/0092010 A1* | 3/2017 | Hato | | G06T 19/006 |
| 2017/0169595 A1* | 6/2017 | Hato | | G06F 3/0487 |
| 2017/0213374 A1 | 7/2017 | Bean et al. | | |
| 2017/0228934 A1 | 8/2017 | Koga | | |
| 2018/0121728 A1* | 5/2018 | Wells | | G16H 20/30 |
| 2018/0182064 A1* | 6/2018 | Uehara | | H04N 21/23611 |
| 2019/0037172 A1* | 1/2019 | Choi | | H04M 3/567 |
| 2019/0094981 A1* | 3/2019 | Bradski | | H04N 21/414 |
| 2019/0259201 A1* | 8/2019 | Duca | | G06F 15/20 |
| 2020/0057489 A1* | 2/2020 | Bak | | G06F 3/147 |
| 2020/0184694 A1* | 6/2020 | Joo | | G06T 11/00 |
| 2020/0293120 A1* | 9/2020 | Timonen | | G06F 3/038 |
| 2020/0293166 A1* | 9/2020 | Timonen | | G06F 3/011 |
| 2020/0372253 A1* | 11/2020 | Jain | | G06V 10/225 |
| 2020/0375666 A1* | 12/2020 | Murphy | | A61B 90/90 |
| 2023/0047003 A1* | 2/2023 | Miller | | G06F 16/2379 |

FOREIGN PATENT DOCUMENTS

| | | |
|---|---|---|
| KR | 10-2013-0101380 | 9/2013 |
| KR | 10-2015-0126938 | 11/2015 |
| KR | 10-2016-0023888 | 3/2016 |
| KR | 10-1898075 | 9/2018 |

* cited by examiner

ELECTRONIC DEVICE, AR DEVICE AND METHOD FOR CONTROLLING DATA TRANSFER INTERVAL THEREOF

CROSS-REFERENCE TO RELATED APPLICATIONS

This application is a continuation of International Application No. PCT/KR2021/015947 designating the United States, filed on Nov. 4, 2021, in the Korean Intellectual Property Receiving Office and claiming priority to Korean Patent Application No. 10-2020-0145661, filed on Nov. 4, 2020, in the Korean Intellectual Property Office, the disclosures of which are incorporated by reference herein in their entireties.

BACKGROUND

Field

The disclosure relates to an electronic device and, for example, to an augmented reality (AR) device implementing the AR, an electronic device interworking therewith, and a method for controlling transmission/reception of information for AR implementation.

Description of Related Art

In order to implement virtual reality (VR), augmented reality (AR), or extended reality (XR), various wearable devices can be connected with a portable wireless electronic device such as a smart phone using wireless communication. The AR (or XR) technology can project AR content into the real world through a device in the form of glasses and provide it to a user.

Because of demands such as weight reduction, a wearable device for providing an AR (or XR) environment may depend on an electronic device such as a smart phone for most processes. For example, the wearable device may detect and/or acquire information about a surrounding environment, transmit it to the smart phone, receive the result of implementing the AR environment from the smart phone, and share a screen. AR glasses may output the shared screen.

Screen sharing between the AR glasses and the smart phone is based on a continuous communication connection. Thus, the screen sharing may continue after connection until the connection is terminated. In case of the AR glasses, the AR is a technology that represents a single image by superimposing a virtual image on a real image or background. To this end, the smart phone and the AR glasses may continuously transmit and receive necessary information to and from each other.

In a conventional AR technology, while the smart phone and the AR glasses are connected, the smart phone continuously provides AR image content to the AR glasses. This may lead to power consumption due to the unnecessary use of resources.

SUMMARY

An electronic device according to various example embodiments of the disclosure includes: a communication module comprising communication circuitry and a processor operatively connected to the communication module. The processor may be communicatively connected to an augmented reality (AR) device through the communication module, and may be configured to receive image information obtained by a camera of the AR device from the AR device, to detect an object based on the received image information, to acquire virtual information corresponding to the object, to control the communication module to transmit the virtual information to the AR device, to determine, based on the received image information, whether the object is out of a viewing range of the AR device, and to change a transfer interval of the virtual information for the AR device based on the determination.

An electronic device according to various example embodiments of the disclosure includes: a communication module comprising communication circuitry, a camera, and a processor operatively connected to the communication module. The processor may be configured to acquire image information using the camera, to control the communication module to transmit the image information to a terminal device, to receive virtual information acquired by the terminal device from the terminal device through the communication module, and to change a transfer interval of the image information, based on a reception interval of virtual information received from the terminal device.

A method for changing a transfer interval of virtual information for an augmented reality (AR) device at an electronic device according to various example embodiments of the disclosure may include: receiving image information from the AR device, detecting an object based on the received image information, acquiring virtual information corresponding to the object, transmitting the virtual information to the AR device, determining, based on the received image information, whether the object is out of a viewing range of the AR device, and changing a transfer interval of the virtual information for the AR device based on the determination.

According to various embodiments, controlling the transfer of data between a terminal device (e.g., a smart phone) and an AR device can improve power consumption because of the data transfer.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
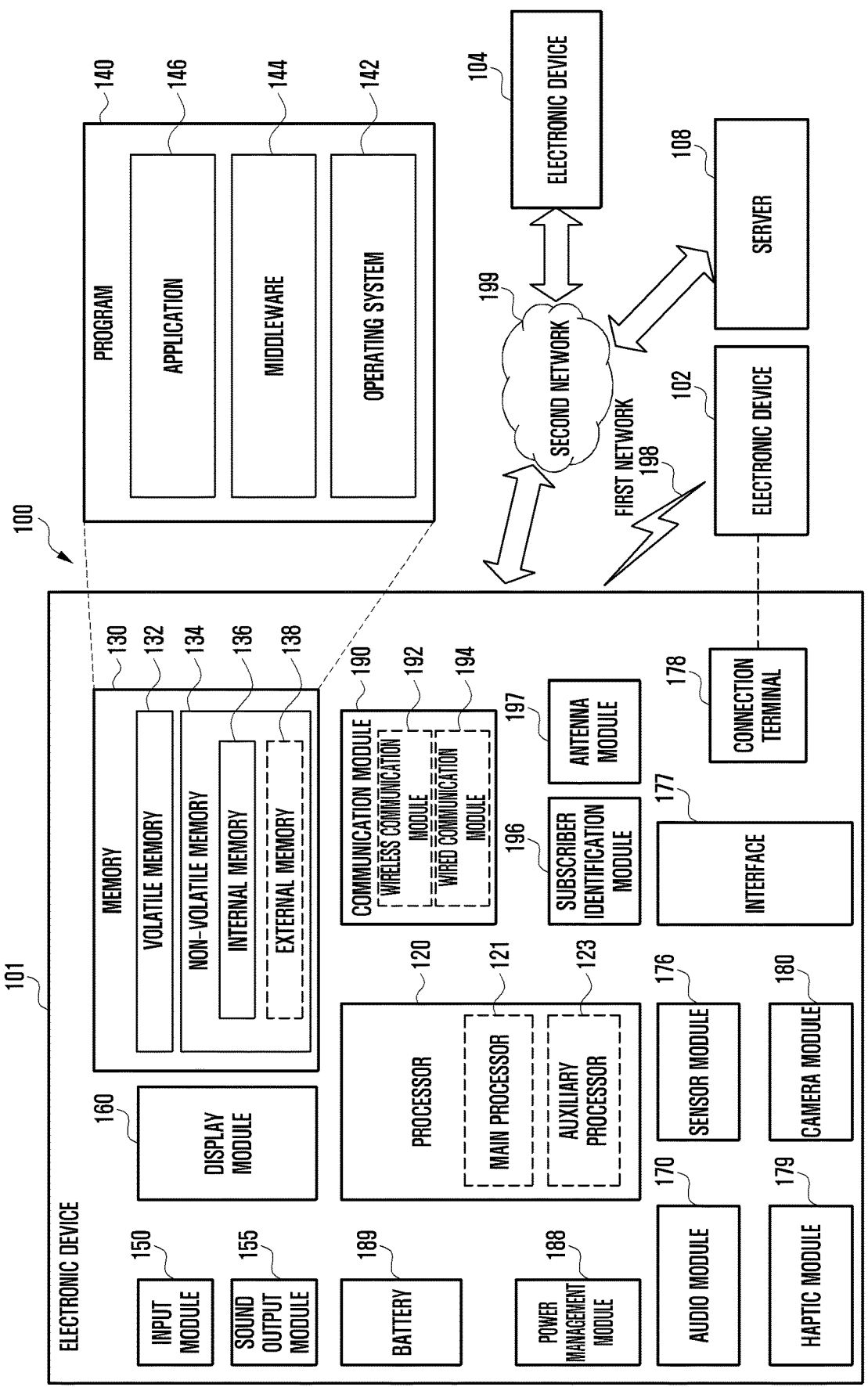
FIG. 1 is a block diagram illustrating an example terminal device in a network environment according to various embodiments.

FIG. 1 is a block diagram illustrating an example terminal device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1module 150, a sound output 1module 155, a display 1module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the 11 connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input 1module 150 may include, for example, a microphone, a mouse, a keyboard, a key (e.g., a button), or a digital pen (e.g., a stylus pen).

The sound output module 155 may output sound signals to the outside of the electronic device 101. The sound output 1module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
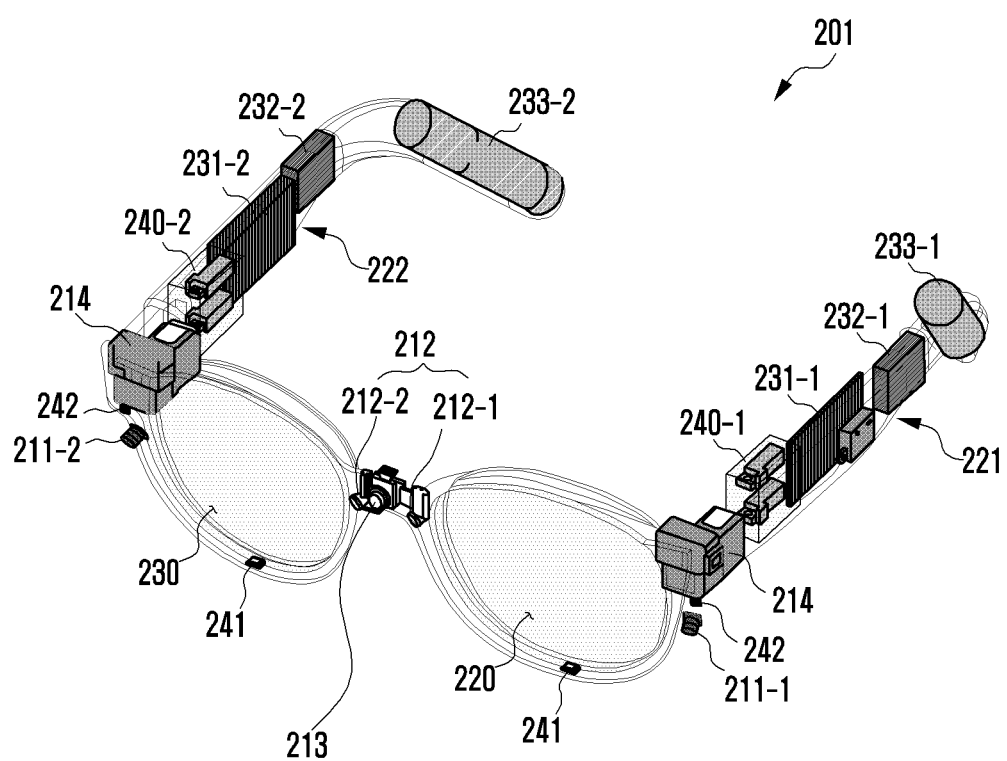
FIG. 2A is a diagram illustrating an example configuration of an AR device according to various embodiments.
Figure 2B:
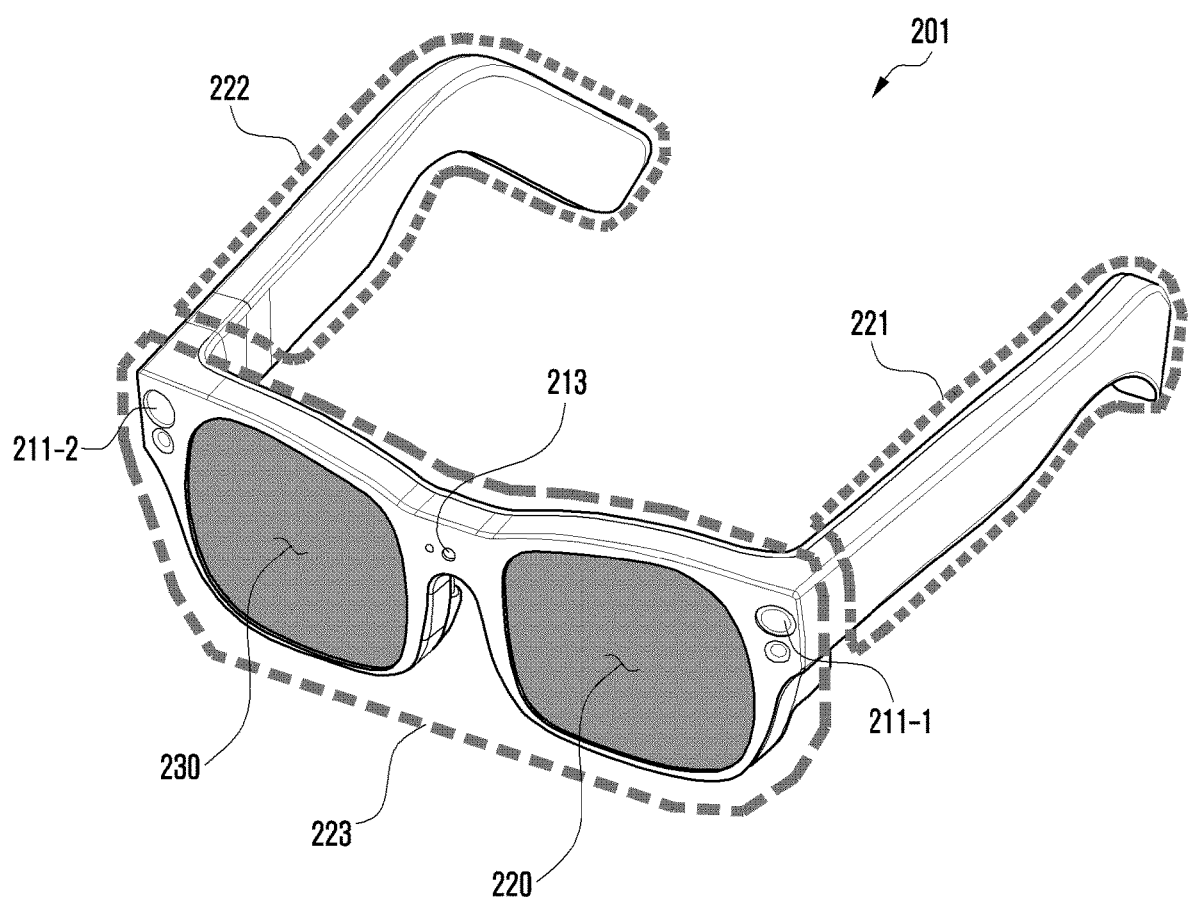
FIG. 2B is a front perspective view illustrating an AR device according to various embodiments.
Figure 2C:
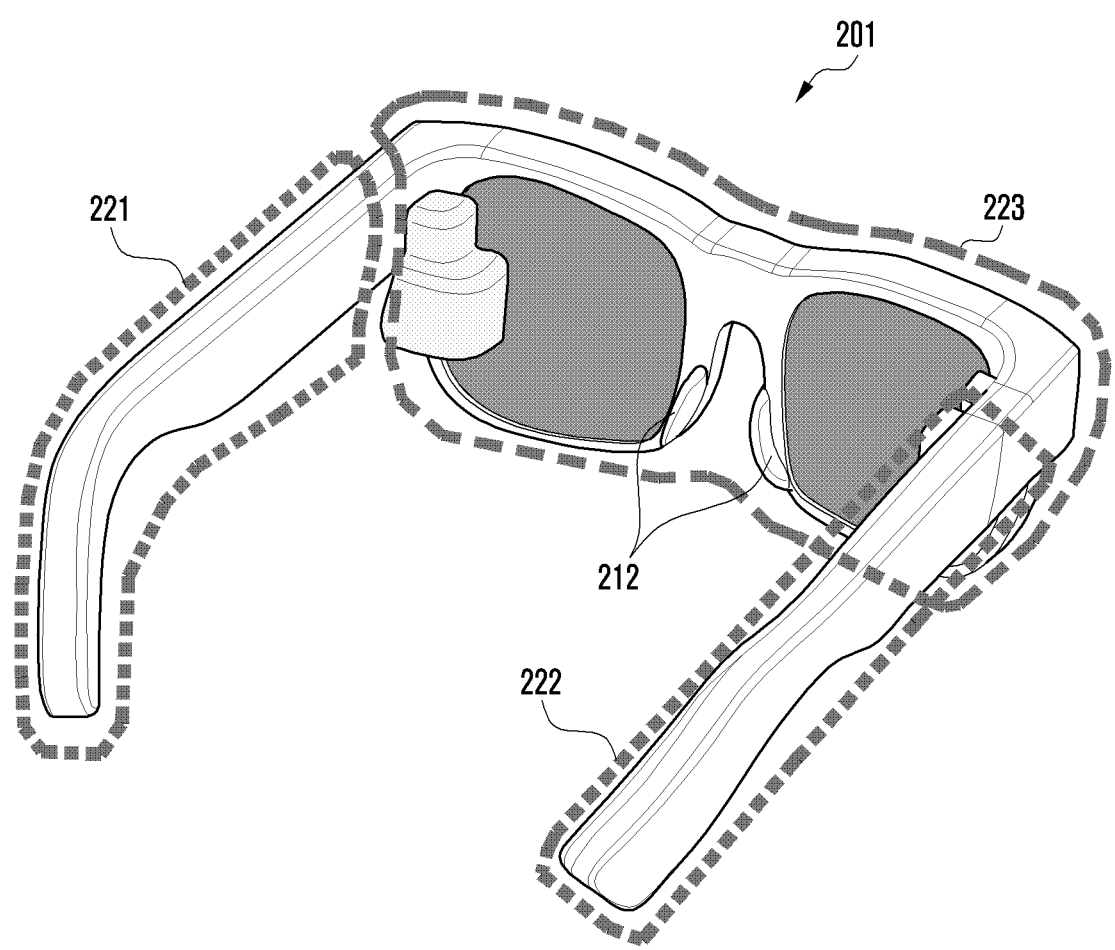
FIG. 2C is a rear perspective view illustrating an AR device according to various embodiments.

FIG. 2A is a diagram illustrating an example overall configuration of an AR device according to various embodiments. FIG. 2B is a front perspective view illustrating an AR device according to various embodiments. FIG. 2C is a rear perspective view illustrating an AR device according to various embodiments. FIG. 2B is a first example view showing the front part of the AR device 201, FIG. 2C is a second example view showing the rear part of the AR device 201, and the internal configuration may be as shown in FIG. 2A.

In various embodiments, the AR device 201 may be worn on a user's head to provide the user with an image related to an AR service. According to an embodiment, the AR device 201 may provide the AR service in which at least one virtual object is output to be superimposed on an area determined as a user's field of view (FoV). For example, the area determined as the user's field of view is an area determined to be recognizable through the AR device 201 by the user wearing the AR device 201, and it may be an area including the overall or at least a part of a display module (e.g., a display module 428 in FIG. 4) of the AR device 201. According to an embodiment, the AR device 201 may include a plurality of glasses (e.g., a first glass 220 and/or a second glass 230) corresponding to both eyes of the user (e.g., left eye and/or right eye). The plurality of glasses may include at least a part of a display module (e.g., a first display module 428-1 and/or a second display module 428-2 in FIG. 4). For example, the first glass 220 corresponding to the user's left eye may include the first display module 428-1, and the second glass 230 corresponding to the user's right eye may include the second display module 428-2. The AR device 201 may be configured, for example, in the form of at least one of glasses, goggles, a helmet, or a hat, but is not limited thereto.

With reference to FIG. 2A, the AR device 201 according to an embodiment may include a display module 214, a camera module, an audio module, a first support part 221, and/or a second support part 222. According to an embodiment, the display module may include a first display (e.g., the first glass 220) (e.g., the first display module 428-1 in FIG. 4) and/or a second display (e.g., the second glass 230) (e.g., the second display module 428-2 in FIG. 4). According to an embodiment, at least one camera may include a shooting camera 213 for capturing an image corresponding to the user's field of view (FoV) and/or measuring a distance to an object, an eye tracking camera 212 for identifying the direction of a user's gaze, and/or gesture cameras 211-1 and 211-2 for recognizing a certain space. For example, the shooting camera 213 may photograph in a front direction of the AR device 201, and the eye tracking camera 212 may photograph in a direction opposite to the photographing direction of the shooting camera 213. For example, the eye tracking camera 212 may photograph at least in part both eyes of the user. According to an embodiment, the first support part 221 and/or the second support part 222 may include a printed circuit board (PCB) 231-1, 231-2, a speaker 232-1, 232-2, and/or a battery 233-1, 233-2.

According to an embodiment, the display module (e.g., the display module 214 in FIG. 2A) may be disposed in a body part (e.g., a body part 223 in FIG. 2B) of the AR device 201, and may include a condensing lens (not shown) and/or a transparent waveguide (not shown) on the glass (e.g., the first glass 220 and the second glass 230). For example, the transparent waveguide may be positioned at least in part on a portion of the glass. According to an embodiment, the light emitted from the display module may be incident on one end of the glass through the first glass 220 and the second glass 230, and the incident light may be transferred to the user through the waveguide formed on the glass. The waveguide may be made of glass, plastic, or polymer, and may include a nano-pattern, e.g., a polygonal or curved grating structure, formed on one inner or outer surface thereof. According to an embodiment, the incident light may be propagated or reflected inside the waveguide by the nano-pattern and provided to the user. According to an embodiment, the waveguide may include at least one diffractive element (e.g., a diffractive optical element (DOE) or a holographic optical element (HOE)) and/or a reflective element (e.g., a reflective mirror). According to an embodiment, using the at least one diffractive element or the reflective element, the waveguide may guide the display light emitted from the light source to the user's eyes.

With reference to FIG. 2A, the first support part 221 and/or the second support part 222 may include the printed circuit board 231-1, 231-2 for transmitting an electrical signal to respective components of the AR device 201, the speaker 232-1, 232-2 for outputting an audio signal, the battery 233-1, 233-2, and/or a hinge part 240-1, 240-2 coupled at least in part to the body part 223 of the AR device 201. According to an embodiment, the speaker 232-1, 232-2 may include a first speaker 232-1 for transferring an audio signal to the user's left ear and a second speaker 232-2 for transferring an audio signal to the user's right ear. According to an embodiment, the AR device 201 may include a plurality of batteries 233-1 and 233-2, which may supply power to the printed circuit boards 231-1 and 231-2 through a power management module.

Referring to FIG. 2A, the AR device 201 may include a microphone 241 for receiving a user's voice and ambient sounds. The AR device 201 may include at least one light emitting device (illumination LED) 242 for increasing the accuracy of the at least one camera (e.g., the shooting camera 213, the eye tracking camera 212, and/or the gesture cameras 211-1 and 211-2). For example, the light emitting device 242 may be used as an auxiliary means to increase accuracy when the eye tracking camera 212 photographs the user's pupil, and the light emitting device 242 may use an IR LED having an infrared wavelength rather than a visible light wavelength. In another example, when the gesture cameras 211-1 and 211-2 take a user's gesture, the light emitting device 242 may be used as an auxiliary means if it is not easy to detect a subject to be photographed due to a dark environment or mixing of various light sources and reflected light.

With reference to FIGS. 2B and 2C, the AR device 201 according to an embodiment may include the body part 223 and the support part (e.g., the first support part 221 and/or the second support part 222), and the body part 223 and the support parts 221 and 222 may be operatively connected. For example, the body part 223 and the support parts 221 and 222 may be operatively connected through the hinge parts 240-1 and 240-2. The body part 223 may be mounted at least in part on the user's nose, and may include the display module and the camera module. The support parts 221 and 222 may include a support member mounted on the user's ear, and may include the first support part 221 mounted on the left ear and/or the second support part 222 mounted on the right ear. According to an embodiment, the first support part 221 or the second support part 222 may include at least in part the printed circuit board 231-1, 231-2, the speaker 232-1, 232-2, and/or the battery 233-1, 233-2. The battery may be electrically connected to the power management module.

According to an embodiment, the display module may include the first glass 220 and/or the second glass 230, and may provide visual information to the user through the first glass 220 and the second glass 230. The AR device 201 may include the first glass 220 corresponding to the left eye and/or the second glass 230 corresponding to the right eye. According to an embodiment, the display module may include a display panel and/or a lens (e.g., glass). For example, the display panel may include a transparent material such as glass or plastic.

According to an embodiment, the display module may be formed of a transparent element, so the user may recognize a real space behind the display module through the display module. The display module may display a virtual object on at least a portion of the transparent element so that the virtual object can be seen to the user as if added to at least a portion of the real space. The first glass 220 and/or the second glass 230 included in the display module may include a plurality of display panels corresponding to both eyes of the user (e.g., the left eye and/or the right eye).

According to an embodiment, the AR device 201 may include a virtual reality (VR) device. When the AR device 201 is the VR device, the first glass 220 may be the first display module 428-1, and the second glass 230 may be the second display module 428-2.

According to an embodiment, the virtual object output through the display module may include information related to an application program executed in the AR device 201 and/or information related to an external object located in the real space corresponding to an area determined as a user's field of view (FoV). For example, from image information related to the real space acquired through the camera (e.g., the shooting camera 213) of the AR device 201, the AR device 201 may identify an external object included in at least a portion corresponding to the area determined as the user's field of view (FoV). The AR device 201 may output (or display) a virtual object related to the identified external object through the area determined as the user's field of view in the display area of the AR device 201. The external object may include a thing existing in the real space. According to various embodiments, the display area in which the AR device 201 displays the virtual object may include a portion (e.g., at least a portion of the display panel) of the display module (e.g., the first display module 428-1 or the second display module 428-2). According to an embodiment, the display area may correspond to at least a portion of the first glass 220 and/or the second glass 230.

According to an embodiment, the AR device 201 may include the shooting camera 213 (e.g., an RGB camera) for capturing an image corresponding to the user's field of view (FoV) and/or measuring a distance to an object, the eye tracking camera 212 for identifying the direction of a user's gaze, and/or the recognizing cameras 211-1 and 211-2 (e.g., gesture camera) for recognizing a certain space. According to an embodiment, using the shooting camera 213, the AR device 201 may measure a distance to an object located in the front direction of the AR device 201. According to an embodiment, in the AR device 201, a plurality of eye tracking cameras 212 may be disposed to correspond to both eyes of the user. For example, the eye tracking camera 212 may photograph in a direction opposite to the photographing direction of the shooting camera 213. The eye tracking camera 212 may detect the user's gaze direction (e.g., eye movement). For example, the eye tracking camera 212 may include a first eye tracking camera 212-1 for tracking the gaze direction of the user's left eye, and a second eye tracking camera 212-2 for tracking the gaze direction of the user's right eye. According to an embodiment, using the recognizing cameras 211-1 and 211-2, the AR device 201 may detect a user gesture within a predetermined distance (e.g., a certain space). For example, there may be a plurality of recognizing cameras 211-1 and 211-2, which may be disposed on both sides of the AR device 201. Using at least one camera, the AR device 201 may detect an eye corresponding to a primary eye and/or an auxiliary eye from among the left eye and/or the right eye. For example, the AR device 201 may detect an eye corresponding to the primary eye or the auxiliary eye or both, based on the user's gaze direction with respect to the external object or the virtual object.

According to an embodiment, the shooting camera 213 may include a high resolution (HR) camera and/or a photo video (PV) camera. According to an embodiment, the eye tracking camera 212 may detect the user's pupil, thereby track the gaze direction, and may be utilized to move the center of a virtual image along the gaze direction. For example, the eye tracking camera 212 may be divided into the first eye tracking camera 212-1 corresponding to the left eye and the second eye tracking camera 212-2 corresponding to the right eye, which may have substantially the same performance and/or specifications. According to an embodiment, the recognizing cameras 211-1 and 211-2 may be used for detection of a user's hand (gesture) or spatial recognition or both, and may include a global shutter (GS) camera. For example, in order to detect and track quick hand movements and/or minute finger movements, the recognizing cameras 211-1 and 211-2 may include the GS camera with less screen afterimage such as a rolling shutter (RS) camera.

According to an embodiment, the AR device 201 may display together a virtual object related to the AR service, based on image information related to a real space acquired through a camera (e.g., the camera module 422 in FIG. 4) of the AR device 201. According to an embodiment, the AR device 201 may display the virtual object, based on a display module (e.g., the first display module 428-1 corresponding to the left eye and/or the second display module 428-2 corresponding to the right eye) disposed to correspond to both eyes of the user. According to an embodiment, the AR device 201 may display the virtual object, based on predetermined setting information (e.g., resolution, frame rate, brightness, and/or display area).

According to an embodiment, the AR device 201 may enable the first display panel included in the first glass 220 and the second display panel included in the second glass 230 to be operated as independent components, respectively. For example, the AR device 201 may determine the display performance of the first display panel, based on first setting information, and may determine the display performance of the second display panel, based on second setting information.

The number and location(s) of one or more cameras (e.g., the shooting camera 213, the eye tracking camera 212, or the recognizing camera 211-1, 211-2) included in the AR device 201 shown in FIG. 2A, FIG. 2B, and/or FIG. 2C may not be limited. For example, based on the form (e.g., shape or size) of the AR device 201, the number and location(s) of one or more cameras (e.g., the shooting camera 213, the eye tracking camera 212, and/or the recognizing camera 211-1, 211-2) may vary.

Figure 3:
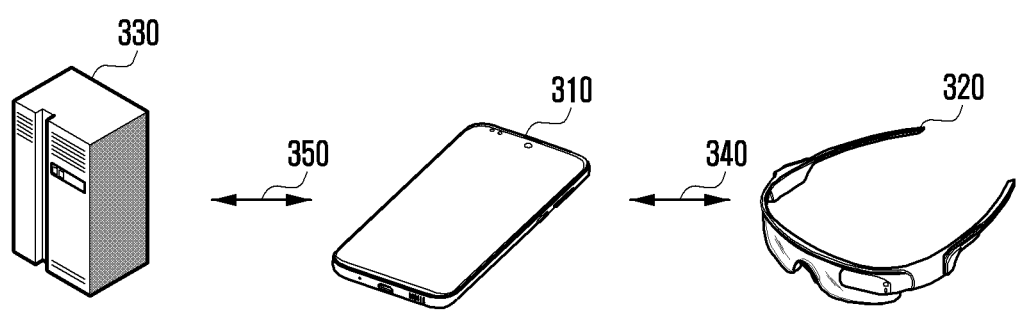
FIG. 3 is a diagram illustrating an example connection relationship among a terminal device, an AR device, and a server according to various embodiments.

FIG. 3 is a diagram illustrating an example connection relationship among a terminal device, an AR device, and a server according to various embodiments.

With reference to FIG. 3, in order to provide the AR service, the terminal device 310 and the AR device 320 may be connected to each other using a wireless network 340. The terminal device may include a device that performs wireless communication and performs various operations for providing the AR service. The terminal device may be, for example, any one of a smart phone, a PC, a tablet PC, or the like, and is not limited to the above-mentioned examples. The AR device may be in the form of glasses that can be worn by the user.

According to various embodiments, the terminal device may receive information necessary to provide the AR service from the AR device through a wireless network, generate virtual information and a virtual object to be output based on the received information, and transmit them to the AR device. The terminal device may receive information about the real environment from the AR device through the wireless network. According to various embodiments of the disclosure, the terminal device may receive, in real time, location information and sensor information of the AR device acquired by the AR device and image information captured by the AR device. The terminal device may acquire virtual information, based on the information received from the AR device. The virtual information may include information related to a real object. For example, when the real object is an image (e.g., a QR code) of a certain pattern, the virtual information may include related information generated by recognizing the pattern image. According to various embodiments, the virtual information may include image information. The terminal device may generate a three-dimensional virtual object based on information received from the AR device, convert the three-dimensional virtual object into a two-dimensional image to be output by the AR device, and transmit the two-dimensional image.

The AR device may transmit various kinds of information for providing the AR service through the wireless network. According to various embodiments, the AR device may acquire location information and sensor information of the AR device, acquire image information by capturing an actual environment, and transmit them to the terminal device in real time. The AR device may receive virtual information acquired by the terminal device through the wireless network and output the virtual information. According to various embodiments, the AR device may receive and output a two-dimensional image related to a virtual object generated and transmitted by the terminal device.

The terminal device and the AR device may be connected to each other via the wireless communication network 340. The wireless communication network that connects the terminal device and the AR device may be a short-range wireless network (e.g., the first network 198 in FIG. 1). According to various embodiments, the terminal device and the AR device may be connected to each other using at least one wireless communication scheme among WiFi-P2P, Bluetooth, and Bluetooth low energy (BLE), but the wireless communication scheme is not limited to the above examples.

With reference to FIG. 3, the server 330 may be communicatively connected to the terminal device using wireless communication. The communication network 350 that connects the server and the terminal device may be a long-range wireless communication network (e.g., the second network 199 in FIG. 1). According to various embodiments, the server and the terminal device may be connected to each other using at least one wireless communication scheme among a cellular network, a 5G network, a next-generation communication network, and the Internet, but the wireless communication scheme is not limited to the above examples. According to various embodiments, the server may acquire virtual information for implementing the AR service. In this case, the terminal device may receive the location information and the sensor information of the AR device acquired by the AR device and the image information captured by the AR device in real time and relays them to the server, and the server may acquire virtual information based on the information received from the terminal device. According to various embodiments, the server may transmit the acquired virtual information to the terminal device, and the terminal device may relay the received virtual information to the AR device.

Figure 4A:
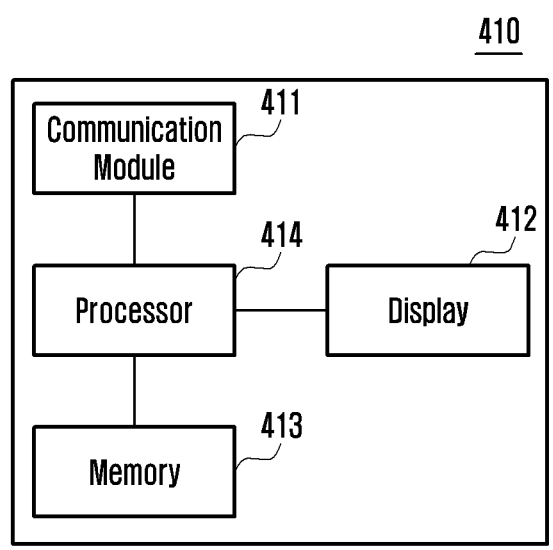
FIGS. 4A and 4B are block diagrams illustrating an example configuration of a terminal device and an AR device, respectively, according to various embodiments.
Figure 4B:
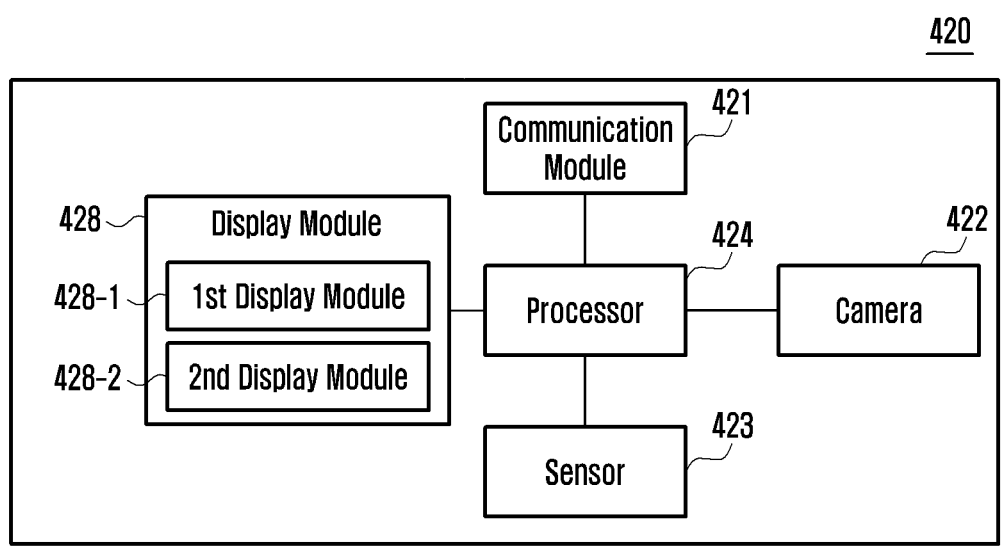

FIG. 4A is a block diagram illustrating an example configuration of a terminal device 410 according to various embodiments, and FIG. 4B is a block diagram illustrating an example configuration of an AR device 420 according to various embodiments.

With reference to FIG. 4A, the terminal device 410 may include a communication module (e.g., including communication circuitry) 411, a display 412, a memory 413, and a processor (e.g., including processing circuitry) 414. The terminal device 410 may further include at least some of the configurations and/or functions of the electronic device 101 in FIG. 1.

The communication module 411 may include a software and/or hardware module (e.g., a communication processor (CP)) including various communication circuitry for wirelessly communicating with a network or an external electronic device (e.g., the AR device 420 in FIG. 4B and/or the server 330 in FIG. 3), and may include at least some of the configurations and/or functions of the communication module 190 in FIG. 1. The communication module 411 may communicate with the external electronic device through a wireless communication network (e.g., the first network 198 or the second network 199 in FIG. 1). According to various embodiments, the communication module 411 may transmit data, provided from other components (e.g., the processor 414) of the terminal device, to the external electronic device, or may provide data, received from the external electronic device, to other components of the terminal device. The communication module 411 may perform communication with the external electronic device (e.g., the AR device 420) through the wireless communication network (e.g., the first network 198 in FIG. 1) (e.g., short-range wireless communication network), or may perform communication with another external electronic device or a server (e.g., the server 330 in FIG. 3) through a long-range wireless network (e.g., the second network 199 in FIG. 1). According to various embodiments, the terminal device 410 may communicate with the AR device 420 through the server 330.

The display 412 may visually output and provide information of the terminal device, and may include at least some of the functions and/or configurations of the display module 160 in FIG. 1. For example, the display 412 may output data, provided from another component (e.g., the processor 414) of the terminal device, to the outside of the terminal device.

The memory 413 may store various data used by at least one component (e.g., the processor 414) of the terminal device, and may include at least some of the configurations and/or functions of the memory 130 in FIG. 1. According to various embodiments, the memory 413 may store instructions executed by the processor 414. For example, the memory 413 may store an instruction that causes the processor 414 to acquire virtual information related to providing the AR service.

The processor 414 may include various processing circuitry and process data in the terminal device, control at least one other component related to the function of the terminal device, and perform data processing and calculation necessary for performing the function. The processor 414 may include at least some of the functions and/or configurations of the processor 120 in FIG. 1. The processor 414 may be electrically and/or functionally connected to components of the terminal device, such as the communication module 411, the display 412, and the memory 413. According to various embodiments, although there may be no limitations on the computation and data processing functions that the processor 414 can implement in the terminal device, the disclosure will focus on the function of controlling an interval of transmitting virtual information to the AR device in order to provide the AR service.

According to various embodiments, the processor 414 may receive data for providing the AR service from the AR device through the communication module 411. For example, the processor 414 may receive image information and motion information of the AR device from the AR device. According to various embodiments, the image information may include at least one image captured by the camera of the AR device, and the AR device 420 may transmit the image captured by the camera in real time to the terminal device 410 in a streaming manner. The motion information may include physical quantities (e.g., geographic location, velocity, acceleration, angular velocity, and angular acceleration of the AR device) related to the motion of the AR device obtained from the sensor of the AR device. The processor 414 may establish a wireless communication connection with the AR device using the communication module 411, and it may receive data from the AR device through wireless communication with the AR device.

According to various embodiments, the processor 414 may detect an object, based on image information and/or motion information received from the AR device. The object may be, for example, information related to a specific object and/or image in an image captured by the AR device. According to various embodiments, the processor 414 may analyze shapes of surrounding things, a distance to a specific thing, a topography, and an environment using the image information and/or the motion information, thereby recognize a real thing, and detect the recognized thing as an object. When detecting the object, the processor 414 may also detect object-related information including shape information of the object and location information of the object.

According to various embodiments, the processor 414 may acquire virtual information corresponding to the detected object. The virtual information may include object-related information, for example, multimedia data such as object-related text information (e.g., object description information, URL information), voice information, and image information.

According to various embodiments, the virtual information may include 2D and/or 3D image information. For example, the processor 414 may generate a 2D or 3D virtual object, based on the detected object, the image information, and/or the motion information of the AR device. According to various embodiments, the processor 414 may generate a virtual object and acquire virtual information including location information and shape information of the virtual object. For example, the processor 414 may perform modeling of a virtual space, based on data received from the AR device, generate a 2D image by capturing a scene, viewed from a specific position in the virtual space, of the virtual object disposed in the virtual space, and acquire virtual information including such a virtual object image.

According to various embodiments, the virtual information is 2D image information, which includes information about a virtual object, and the remaining area may be processed as a blank. As such, because the virtual information is configured as 2D image information, the AR device that has received the virtual information in real time can display the received virtual information on a display (e.g., the display module 428 in FIG. 4B) without additional image processing. The processor 414 may separately generate virtual information corresponding to both eyes and transmit it to the AR device in real time.

According to various embodiments, the processor 414 may receive information related to a virtual object corresponding to the object detected in image information from a server (e.g., the server 330 in FIG. 3). For example, the processor 414 may transmit information about the detected object to the server, acquire a virtual object corresponding to the object, received from the server, from a database of the server or another server, and provide it to the terminal device 410. Alternatively, the server may acquire virtual information which is a 2D image including a virtual object, and provide it to the terminal device 410. Alternatively, the processor 414 may transmit at least a portion of image information received from the AR device to the server, acquire a detected object and virtual information from the server, and provide them to the terminal device 410.

According to various embodiments, the processor 414 may transmit virtual information to the AR device. The processor 414 may be communicatively connected to the AR device through the communication module 411, and may transmit the acquired virtual information to the AR device. For example, the processor 414 may transmit multimedia data related to the object and/or image information of the generated virtual object to the AR device. The processor 414 may transmit the virtual information, based on a specific frame rate.

According to various embodiments, the processor 414 may determine whether the object is out of a viewing range of the AR device. According to an embodiment, the viewing range of the AR device may be a range that the user wearing the AR device 201 can recognize through the AR device 201. For example, the viewing range may be the field of view (FoV) of the AR device. In another example, when the object and the virtual object overlap in positions or exist on the same line with respect to the user's gaze and thus one of both is obscured by the other, the overlapping or obscured object may be determined to be out of the viewing range. The processor 414 may determine whether the object is out of the viewing range, based on location information and motion information of the AR device, location information of the object, and/or location information of the virtual object included in the virtual information.

According to various embodiments, when the object exists in the viewing range, the processor 414 may determine whether a motion level of the AR device and/or a motion level of the virtual object are/is less than or equal to a predetermined motion level. The processor 414 may receive motion information (e.g., geographic location, velocity, acceleration, angular velocity, and angular acceleration) of the AR device from the AR device, and may identify the motion level of the AR device based on the received motion information. According to various embodiments, the processor 414 may measure the motion level of the virtual object based on location information of the virtual object included in the virtual information. The processor 414 may measure the motion level of the virtual object corresponding to the received image using the motion level of the AR device, the motion level based on the location information of the virtual object, and/or a combination thereof. The processor 414 may compare the measured motion level with a predetermined motion level and thereby determine whether the measured motion level is less than or equal to the predetermined motion level.

According to various embodiments, the processor 414 may change the transfer interval of the virtual information. When the object is out of the viewing range of the AR device, the processor 414 may change the transfer interval of the virtual information. When the object is out of the viewing range of the AR device, the virtual information may not exist in the user's field of view, and there may be no need to transmit the virtual information. Therefore, when the object is out of the viewing range, the processor 414 may change the transfer interval of the virtual information to transmit the virtual information at a low frame rate or may not transmit the virtual information. According to various embodiments, even when the virtual object is out of the user's field of view, the processor may change the transfer interval of the virtual information to decrease the virtual information transmission rate or may not transmit the virtual information. The virtual information transmitted by the processor may include data (e.g., key frame) related to a certain image, and even if the transfer interval is infinitely changed, the processor may be in a state of continuously transmitting metadata such as system time. According to various embodiments, the processor 414 may change the transfer interval of the virtual information or stop the transmission, and if it is unnecessary to transmit the virtual information, the processor 414 may even stop transmission of image-related data and metadata. According to various embodiments, even in case that the object is not out of the viewing range, the processor 414 may change the transfer interval of the virtual information when the motion level of the AR device and/or the virtual object is less than or equal to a predetermined level. When the motion level is less than or equal to a certain level, the virtual information (e.g., the image of the virtual object) may be in a state with little change, and thus it may not be necessary to transmit the virtual information at the existing rate. According to various embodiments, the processor 414 may change the transfer interval by changing the transmission frame per second (FPS) of the virtual information, and may stop the transmission of the virtual information by changing the transfer interval to infinity. Alternatively, when the transmission of the virtual information is unnecessary, the processor may even stop the transmission of image-related data and metadata.

With reference to FIG. 4B, the AR device 420 may include a communication module (e.g., including communication circuitry) 421, a camera 422, a sensor 423, a display module (e.g., including at least one display) 428, and a processor (e.g., including processing circuitry) 424.

The AR device 420 may be in the form of glasses that a user can wear, as shown in FIGS. 2A, 2B and 2C.

The communication module 421 may include a software and/or hardware module (e.g., a communication processor (CP)) including various communication circuitry for wirelessly communicating with a network or an external electronic device (e.g., the terminal device 410 in FIG. 4A). The communication module 421 may communicate with an external electronic device through a wireless communication network (e.g., the first network 198 in FIG. 1). According to various embodiments, the communication module 421 may transmit data, provided from other components (e.g., the processor 424) of the AR device, to the external electronic device, or may provide data, received from the external electronic device, to other components of the AR device.

The camera 422 may capture still images and moving images. According to an embodiment, the camera may include one or more lenses and image sensors. According to various embodiments, the camera 422 may include at least some of the functions and/or configurations of the camera module in FIG. 2. The camera may capture an actual image corresponding to a field of view (FoV) and/or measure a distance to an object, and may include a gesture camera for recognizing a certain space. According to various embodiments, in order to acquire image information, the camera may capture an actual image corresponding to the field of view of the AR device.

The sensor 423 may detect the motion of the AR device. According to various embodiments, the sensor may detect physical quantities related to the motion of the AR device, for example, velocity, acceleration, angular velocity, angular acceleration, and geographic location of the AR device. The sensor 423 may include various sensors, and may detect the motion of the AR device including a position, velocity, and/or posture of the AR device by including a gyro sensor and a gravity sensor.

The display module 428 may include at least one display and visually output information inside the AR device. For example, the display module 428 may output virtual information received from the terminal device by the AR device. According to various embodiments, the display module 428 may include the glass of FIG. 2A (e.g., the first glass 220 and the second glass 230), emit light to a transparent waveguide included in at least a part of the glass, and output virtual information by guiding the emitted light to the user's eyes. The display module 428 may include the first display module 428-1 including a display corresponding to the user's left eye and the second display module 428-2 including a display corresponding to the user's right eye. According to an embodiment, the display module 428 may include glass including a transparent (or semi-transparent) element, and the user can recognize a real space behind the display module 428 through the display module 428. The display module 428 may display a virtual object on at least a portion of the transparent element so that the virtual object can be seen to the user as if added to at least a portion of the real space.

The processor 424 may include various processing circuitry and process data in the AR device, control at least one other component related to the function of the AR device, and perform data processing and calculation necessary for performing the function. The processor 424 may be electrically and/or functionally connected to components of the AR device, such as the communication module 421, the camera, the sensor, and the display module 428. According to various embodiments, although there may be no limitations on the computation and data processing functions that the processor 424 can implement in the AR device, the disclosure will focus on the function of the AR device for providing the AR service.

According to various embodiments, the processor 424 may acquire image information and/or motion information of the AR device. The processor 424 may capture an image through the camera and acquire the image information. According to various embodiments, the processor 424 may acquire actual image information including image information about an image, distance information with a specific object existing in the image, and depth information. According to various embodiments, the processor 424 may measure physical quantities (e.g., geographic location, velocity, acceleration, angular velocity, and angular acceleration) of a device related to the motion of the AR device through the sensor, and acquire the motion information of the AR device using the measured physical quantities or a combination thereof.

According to various embodiments, the processor 424 of the AR device may transmit data for providing the AR service to the terminal device. For example, the processor 424 may transmit image information and motion information of the AR device to the terminal device. According to various embodiments, the image information may include at least one image captured by the camera of the AR device, and the motion information may include physical quantities (e.g., geographic location, velocity, acceleration, angular velocity, and angular acceleration of the AR device) related to the motion of the AR device obtained from the sensor of the AR device. The processor 424 may establish a wireless communication connection with the terminal device using the communication module 421, and may transmit information for providing the AR service through wireless communication with the terminal device.

According to various embodiments, the processor 424 of the AR device may receive virtual information from the terminal device. According to various embodiments, the processor 424 may receive the virtual information obtained by the terminal device from the terminal device communicatively connected through the communication module 421. For example, the processor 424 may receive multimedia data related to the object generated by the terminal device and/or image information of the generated virtual object from the terminal device. The processor 424 may receive the virtual information in accordance with a specific transmission frame rate of the terminal device.

According to various embodiments, the processor 424 of the AR device may change a transfer interval of image information and/or motion information of the AR device. According to various embodiments, the processor 424 of the AR device may change the transfer interval of image information and/or motion information, based on a reception interval of virtual information received from the terminal device. For example, when the virtual information is received from the terminal device at a low interval, this may be a case that an object or a virtual object is out of a viewing range, or may be in a state where it is not necessary to maintain a transfer rate of image information. In this case, the processor 424 may lower the transfer rate of image information and/or motion information of the AR device. According to various embodiments, when a FPS at which the virtual information is received from the terminal device is lowered or when the virtual information is not received, the processor 424 of the AR device may lower a transmission FPS of image information and/or motion information of the AR device or stop transmission.

Figure 5:
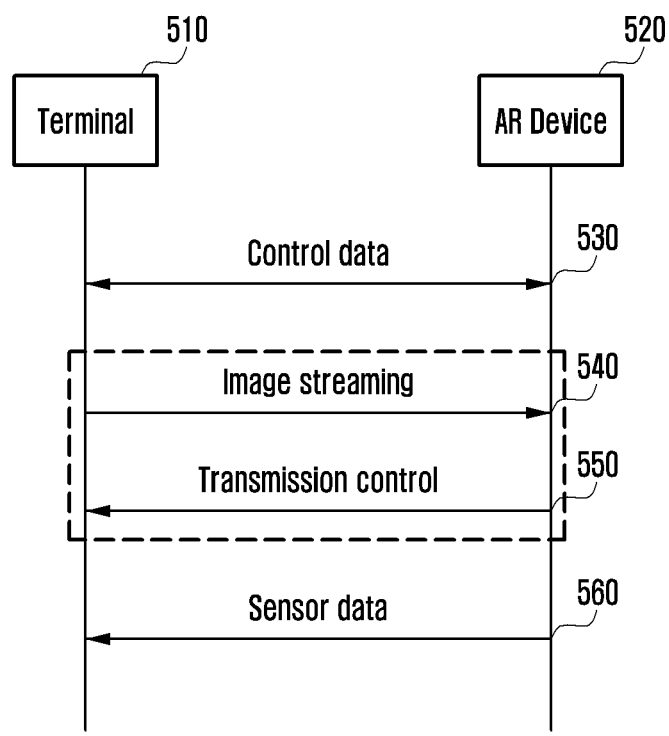
FIG. 5 is a signal flow diagram illustrating example information transfer between a terminal device and an AR device according to various embodiments.

FIG. 5 is a signal flow diagram illustrating example information transfer between a terminal device 510 and an AR device 520 according to various embodiments.

With reference to FIG. 5, information exchanged between the terminal device 510 and the AR device 520 may be briefly expressed as control data 530, image streaming 540, transmission control 550, and sensor data 560.

The control data 530 may include information for controlling the connection between the terminal device 510 and the AR device 520. According to various embodiments, the terminal device 510 and the AR device 520 may be communicatively connected using short-range wireless communication (e.g., Wi-Fi P2P, Bluetooth, BLE), and the control data 530 may include information necessary for communication connection between the AR device 520 and the terminal device 510. For example, the control data 530 may be information necessary for connection establishment, such as IP information and negotiation information of the terminal device 510 and the AR device 520. The terminal device 510 and the AR device 520 may transmit and receive the control data 530 to and from each other.

The image streaming 540 may include virtual information acquired by the terminal device 510. According to various embodiments, the terminal device 510 may acquire the virtual information and transmit it to the AR device 520, and the virtual information may include an object generated by the terminal device 510, a virtual object, and/or multimedia information (e.g., text, audio, image information) related to the object. According to various embodiments, the image streaming 540 may be sent from the terminal device 510 to the AR device 520 based on a specific transfer rate while the terminal device 510 and the AR device 520 are connected. The transmission control 550 may include data transmitted in response to the image streaming 540 to the terminal device 510 by the AR device 520 that has received the image streaming 540 from the terminal device 510. According to various embodiments, the transmission control 550 may include information for controlling data related to the image streaming 540. For example, feedback information about the image streaming 540 received from the terminal device 510 by the AR device 520 may be included.

The sensor data 560 may include image information and/or motion information of the AR device 520 measured by the AR device 520 using a camera (e.g., the camera 422 in FIG. 4B) and/or a sensor (e.g., the sensor 423 in FIG. 4B). The sensor data 560 is transmitted from the AR device 520 to the terminal device 510 and may be transmitted unidirectionally based on a specific transfer rate. According to various embodiments, the sensor data 560 may be transmitted regardless of the transmission order. For example, the sensor data 560 may be data continuously transmitted from the AR device 520 to the terminal device 510 in a connection state between the terminal device 510 and the AR device 520. According to various embodiments, even while the transmission control 550 data is transmitted or received, the transmission or reception of the sensor data 560 may be continued.

Figure 6:
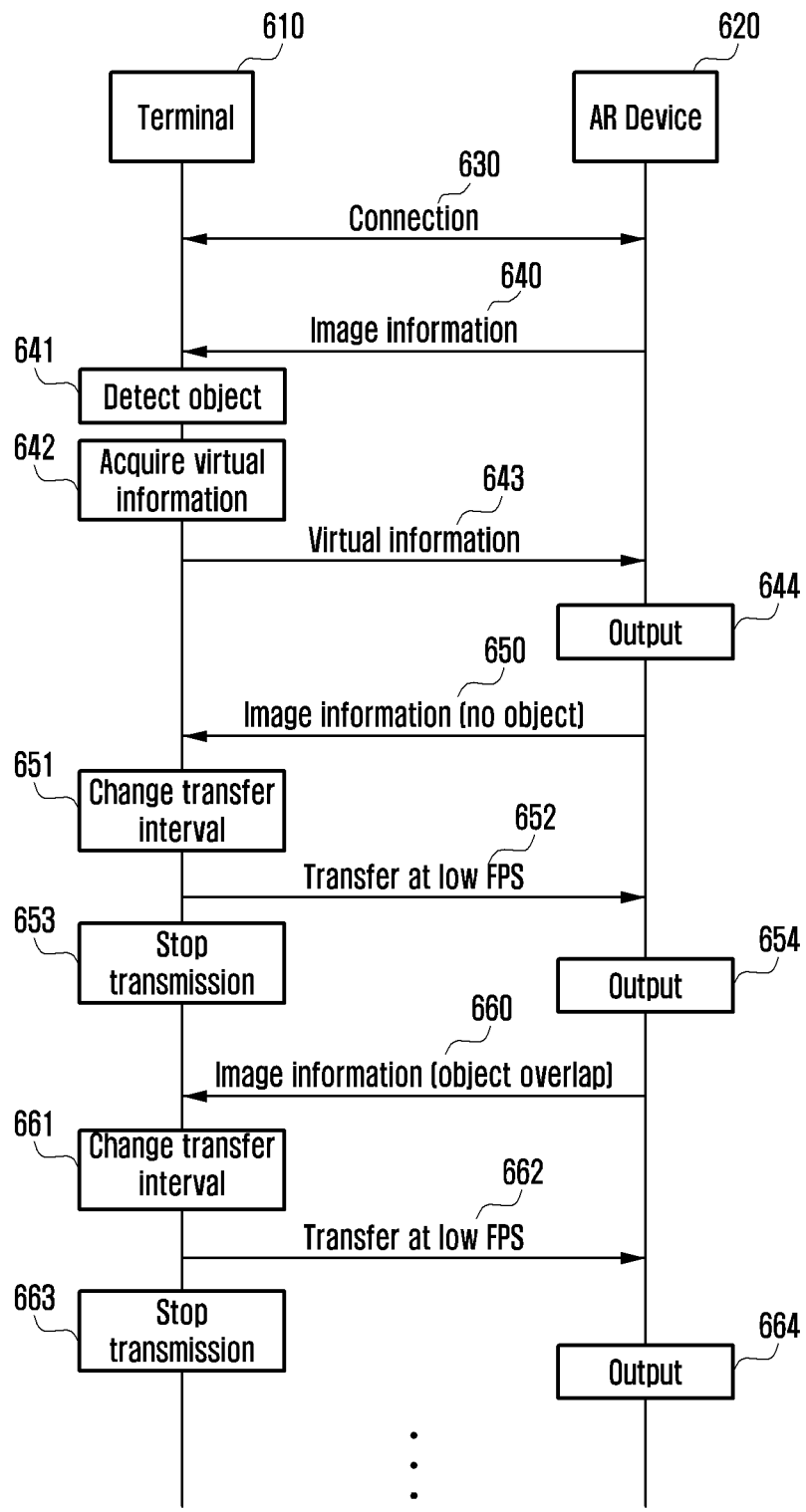
FIG. 6 is a signal flow diagram illustrating example operations of a terminal device and an AR device according to various embodiments.

FIG. 6 is a signal flow diagram illustrating example operations of a terminal device and an AR device according to various embodiments.

With reference to FIG. 6, the operations of the terminal device 610 and the AR device 620 may be operations of a processor (e.g., the processor 414 in FIG. 4A) of the terminal device 610 and/or a processor (e.g., the processor 424 in FIG. 4B) of the AR device 620, respectively.

The terminal device 610 and the AR device 620 may establish a connection with each other using a wireless communication network (630). According to various embodiments, the terminal device 610 and the AR device 620 may be connected to each other using a short-range wireless communication network (e.g., Wi-Fi P2P, Bluetooth, or BLE). The terminal device 610 and the AR device 620 may transmit/receive control information (e.g., the control information 530 in FIG. 5) for establishing the connection with each other, and they may establish the connection with each other using a specific communication scheme.

The AR device 620 may transmit image information to the terminal device 610 (640). The AR device 620 may capture an actual image using a camera (e.g., the camera 422 in FIG. 4B), thereby acquire image information, and transmit image information to the terminal device 610. According to various embodiments, the AR device 620 may acquire motion information of the AR device 620 using a sensor (e.g., the sensor 423 in FIG. 4) of the AR device 620, and transmit the acquired motion information to the terminal device 610.

The terminal device 610 may detect an object, based on the received image information (641). According to various embodiments, the terminal device 610 may detect the object, based on the image information and/or the motion information received from the AR device 620. The terminal device 610 may analyze shapes of surrounding things, a distance to a specific thing, a topography, and an environment using the image information and/or the motion information, thereby recognize a real thing, and detect the recognized thing as an object. According to various embodiments, the terminal device 610 may detect or receive object-related information including shape information of the object and location information of the object.

The terminal device 610 may acquire virtual information, based on the detected object (642). The virtual information may include object-related information, for example, multimedia data such as object-related text information (e.g., object description information, URL information), voice information, and image information. According to various embodiments, the virtual information may include 2D and/or 3D image information. For example, the terminal device 610 may generate a 2D or 3D virtual object, based on the detected object, the image information, and/or the motion information of the AR device 620. According to various embodiments, the terminal device 610 may generate a virtual object and acquire virtual information including location information and shape information of the virtual object. For example, the terminal device 610 may perform modeling of a virtual space, based on data received from the AR device 620, generate a 2D image by capturing a scene, viewed from a specific position in the virtual space, of the virtual object disposed in the virtual space, and acquire virtual information including such a virtual object image.

The terminal device 610 may transmit the acquired virtual information to the AR device 620 (643). For example, the terminal device 610 may transmit (e.g., stream) multimedia data related to the object and/or image information of the generated virtual object to the AR device 620. According to various embodiments, the terminal device 610 may transmit the virtual information, based on a specific frame rate. The AR device 620 may receive from the terminal device 610 the virtual information including the object-related multimedia data and/or the image information of the generated virtual object transmitted by the terminal device 610. The AR device 620 may receive the virtual information in accordance with a specific transmission frame rate of the terminal device 610.

The AR device 620 may output the received virtual information (644). According to various embodiments, the AR device 620 may receive virtual information and output image information of a virtual object included in the virtual information. The AR device 620 may visually output internal information using a display module (e.g., the display module 428 in FIG. 4B), emit light to a transparent waveguide included in at least a part of a glass (e.g., the first glass 220 and the second glass 230 in FIG. 2A) included in the display module, and output the virtual information by guiding the emitted light to the user's eyes. The AR device 620 may display the virtual object on at least a portion of the transparent element so that the virtual object can be seen to the user as if added to at least a portion of the real space projected through the glass.

According to various embodiments, the AR device 620 may be in a state of continuously transmitting image information to the terminal device 610. The AR device 620 may transmit image information of an object which is out of a viewing range of the AR device 620 (650). The terminal device 610 that has received the image information may determine whether the object is out of the viewing range of the AR device 620. According to an embodiment, the viewing range may be the field of view (FoV) of the AR device 620. The terminal device 610 may determine whether the object is out of the viewing range, based on location information and motion information of the AR device 620, location information of the object, and/or location information of the virtual object included in the virtual information. According to various embodiments, when the object exists in the viewing range, the terminal device 610 may determine whether a motion level of the AR device 620 and/or a motion level of the virtual object are/is less than or equal to a predetermined motion level. The terminal device 610 may receive motion information (e.g., geographic location, velocity, acceleration, angular velocity, and angular acceleration) of the AR device 620 from the AR device 620, and may identify the motion level of the AR device 620 based on the received motion information. According to various embodiments, the terminal device 610 may measure the motion level of the virtual object based on location information of the virtual object included in the virtual information. The terminal device 610 may measure the motion level of the virtual object corresponding to the image using the motion level of the AR device 620, the motion level based on the location information of the virtual object, and/or a combination thereof. The terminal device 610 may compare the measured motion level with a predetermined motion level and thereby determine whether the measured motion level is less than or equal to the predetermined motion level.

According to various embodiments, when the object is out of the viewing range of the AR device 620, the terminal device 610 may change the transfer interval of the virtual information (651). When the object is out of the viewing range of the AR device 620, the virtual information may not exist in the user's field of view, and there may be no need to transmit the virtual information. Therefore, when the object is out of the viewing range, the terminal device 610 may change the transfer interval of the virtual information, and may transmit the virtual information at a low frame rate (652) or may not transmit the virtual information (653). The AR device 620 may cut off the power of a display module (e.g., the display module 428 in FIG. 4) if there is no other information to be displayed on the display module, or may utilize a low-power mode by minimizing and/or reducing the power for executing the display module. According to various embodiments, even when the virtual object is out of the user's field of view, the terminal device may change the transfer interval of the virtual information to lower the transmission rate of the virtual information or not to transmit the virtual information. The virtual information transmitted by the terminal device 610 may include data (e.g., key frame) related to a certain image, and even if the transfer interval is infinitely changed, the terminal device 610 may be in a state of continuously transmitting metadata such as system time. According to various embodiments, the terminal device 610 may change the transfer interval of the virtual information or stop the transmission, and if it is unnecessary to transmit the virtual information, the terminal device 610 may even stop transmission of image-related data and metadata. According to various embodiments, even in case that the object is not out of the viewing range, the terminal device 610 may change the transfer interval of the virtual information when the motion level of the AR device 620 and/or the virtual object is less than or equal to a predetermined level. When the motion level is less than or equal to a certain level, the virtual information (e.g., the image of the virtual object) may be in a state with little change, and thus it may not be necessary to transmit the virtual information at the existing rate. According to various embodiments, the terminal device 610 may change the transfer interval by changing the transmission frame per second (FPS) of the virtual information (652), and may stop the transmission of the virtual information by changing the transfer interval to infinity, or when the transmission of the virtual information is unnecessary, may even stop the transmission of image-related data and metadata (653). According to various embodiments, the AR device 620 that has received the virtual information at a low frame rate may output the virtual information at a low FPS (654). In this case, because the motion level is low or there is no motion, the user can recognize, despite the low frame rate, the virtual information at the same or similar level as before the AR device 620 changes the frame rate. According to various embodiments, the AR device 620 that has not received the virtual information may not output the virtual information (654), and the user can visually recognize only the scene that the real environment is projected on the glass (e.g., the first glass 220 and/or the second glass 230 in FIG. 2A) of the AR device.

The AR device 620 may transmit image information in case that objects overlap (660). For example, when the object and the virtual object overlap in positions or exist on the same line with respect to the user's gaze and thus one of both is obscured by the other, the overlapping or obscured object may be determined to be out of the viewing range. The terminal device 610 may determine whether the object and/or the virtual object overlap(s) or are/is obscured, based on location information and motion information of the AR device 620, location information of the object, and/or location information of the virtual object included in the virtual information. According to various embodiments, when the object or the virtual object overlaps or is obscured, the terminal device 610 may determine that such an object is out of the viewing range, and change the transfer interval of the virtual information (661). For example, if the virtual information is not in the user's field of view, it may not be necessary to transmit the virtual information. Therefore, when the object is out of the viewing range, the terminal device 610 may change the transfer interval of the virtual information, and may transmit the virtual information at a low frame rate (662) or may not transmit the virtual information (663). According to various embodiments, even when the virtual object is out of the user's field of view, the terminal device may change the transfer interval of the virtual information to lower the transmission rate of the virtual information or not to transmit the virtual information. The virtual information transmitted by the terminal device 610 may include data (e.g., key frame) related to a certain image, and even if the transfer interval is infinitely changed, the processor may be in a state of continuously transmitting metadata such as system time. According to various embodiments, the terminal device 610 may change the transfer interval of the virtual information or stop the transmission, and if it is unnecessary to transmit the virtual information, the terminal device 610 may even stop transmission of image-related data and metadata. According to various embodiments, the terminal device 610 may change the transfer interval by changing the transmission frame per second (FPS) of the virtual information (662), and may stop the transmission of the virtual information by changing the transfer interval to infinity, or when the transmission of the virtual information is unnecessary, may even stop the transmission of image-related data and metadata (663). According to various embodiments, the AR device 620 that has received the virtual information at a low frame rate may output the virtual information at a low FPS (664). In this case, because the motion level is low or there is no motion, the user can recognize, despite the low frame rate, the virtual information at the same or similar level as before the AR device 620 changes the frame rate. According to various embodiments, the AR device 620 that has not received the virtual information may not output the virtual information (664), and the user can visually recognize only the scene that the real environment is projected on the glass (e.g., the first glass 220 and/or the second glass 230 in FIG. 2A) of the AR device.

Figure 7:
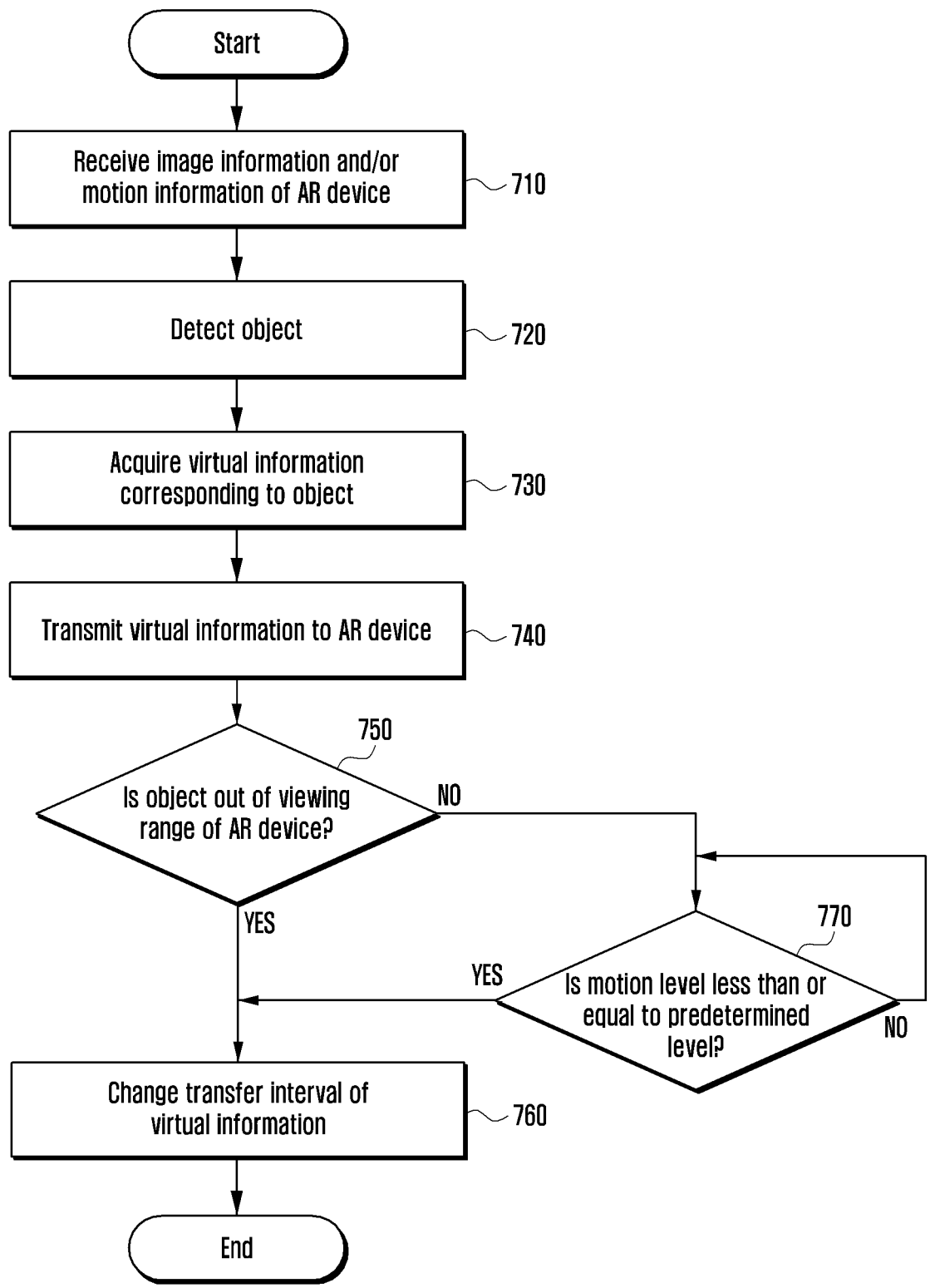
FIG. 7 is a flowchart illustrating example operations of a terminal device according to various embodiments.

FIG. 7 is a flowchart illustrating example operations of a terminal device according to various embodiments.

With reference to FIG. 7, the operations of the terminal device (e.g., the terminal device 410 in FIG. 4A) may be understood as the operations of a processor (e.g., the processor 414 in FIG. 4A) of the terminal device.

At operation 710, the terminal device may receive image information and/or motion information of an AR device (e.g., the AR device 420 in FIG. 4B). According to various embodiments, the image information may include at least one image captured by the camera of the AR device, and the motion information may include physical quantities (e.g., geographic location, velocity, acceleration, angular velocity, and angular acceleration of the AR device) related to the motion of the AR device obtained from a sensor of the AR device. The terminal device may establish a wireless communication connection with the AR device using a communication module (e.g., the communication module 411 in FIG. 4A), and receive the image information and/or the motion information of the AR device from the AR device through wireless communication with the AR device.

At operation 720, the terminal device may detect an object. According to various embodiments, the terminal device may detect the object, based on the image information and/or the motion information received from the AR device. The object may be, for example, information related to a specific object and/or image in an image captured by the AR device. According to various embodiments, the terminal device may analyze shapes of surrounding things, a distance to a specific thing, a topography, and an environment using the image information and/or the motion information, thereby recognize a real thing, and detect the recognized thing as an object. The terminal device may also detect object-related information including shape information of the object and location information of the object.

At operation 730, the terminal device may acquire virtual information corresponding to the object. The virtual information may include object-related information, for example, multimedia data such as object-related text information (e.g., object description information, URL information), voice information, and image information. According to various embodiments, the virtual information may include 2D and/or 3D image information. For example, the processor may generate a 2D or 3D virtual object, based on the detected object, the image information, and/or the motion information of the AR device. According to various embodiments, the processor may generate a virtual object and acquire virtual information including location information and shape information of the virtual object. For example, the processor may perform modeling of a virtual space, based on data received from the AR device, generate a 2D image by capturing a scene, viewed from a specific position in the virtual space, of the virtual object disposed in the virtual space, and acquire virtual information including such a virtual object image.

At operation 740, the terminal device may transmit the virtual information to the AR device. According to various embodiments, the terminal device may be communicatively connected to the AR device through a communication module (e.g., the communication module 411 in FIG. 4A), and may transmit the acquired virtual information to the AR device. For example, the terminal device may transmit multimedia data related to the object and/or image information of the generated virtual object to the AR device. The terminal device may transmit the virtual information, based on a specific frame rate.

At operation 750, the terminal device may determine whether the object is out of a viewing range of the AR device. According to an embodiment, the viewing range of the AR device may be a range that the user wearing the AR device 201 can recognize through the AR device. For example, the viewing range may be the field of view (FoV) of the AR device. In another example, when the object and the virtual object overlap in positions or exist on the same line with respect to the user's gaze and thus one of both is obscured by the other, the overlapping or obscured object may be determined to be out of the viewing range. The terminal device may determine whether the object is out of the viewing range, based on location information and motion information of the AR device, location information of the object, and/or location information of the virtual object included in the virtual information.

When it is determined that the object exists in the viewing range, the terminal device may perform operation 770. At the operation 770, the terminal device may determine whether a motion level of the AR device and/or a motion level of the virtual object are/is less than or equal to a predetermined motion level. The terminal device may receive motion information (e.g., geographic location, velocity, acceleration, angular velocity, and angular acceleration) of the AR device from the AR device, and may identify the motion level of the AR device, based on the received motion information. According to various embodiments, the terminal device may measure the motion level of the virtual object, based on location information of the virtual object included in the virtual information. The terminal device may measure the motion level corresponding to an image of the virtual object using the motion level of the AR device, the motion level based on the location information of the virtual object, and/or a combination thereof. The terminal device may compare the measured motion level with a predetermined motion level and thereby determine whether the measured motion level is less than or equal to the predetermined motion level.

When it is determined that the object is out of the viewing range of the AR device or the motion level is less than or equal to the predetermined level, the terminal device may perform operation 760. At the operation 760, the terminal device may change a transfer interval of the virtual information. When the object is out of the viewing range of the AR device, the processor may change the transfer interval of the virtual information. When the object is out of the viewing range of the AR device, the virtual information may not exist in the user's field of view, and there may be no need to transmit the virtual information. Therefore, when the object is out of the viewing range, the terminal device may change the transfer interval of the virtual information to transmit the virtual information at a low frame rate or not to transmit the virtual information. According to various embodiments, even when the virtual object is out of the user's field of view, the terminal device may change the transfer interval of the virtual information to lower the virtual information transmission rate or may not transmit the virtual information. The virtual information transmitted by the terminal device may include data (e.g., key frame) related to a certain image, and even if the transfer interval is infinitely changed, the processor may be in a state of continuously transmitting metadata such as system time. According to various embodiments, the terminal device may change the transfer interval of the virtual information or stop the transmission, and if it is not necessary to transmit the virtual information, the terminal device may even stop transmission of image-related data and metadata. According to various embodiments, even in case that the object is not out of the viewing range, the terminal device may change the transfer interval of the virtual information when the motion level of the AR device and/or the virtual object is less than or equal to a predetermined level. When the motion level is less than or equal to a certain level, the virtual information (e.g., the image of the virtual object) may be in a state with little change, and thus it may not be necessary to transmit the virtual information at the existing rate. According to various embodiments, the terminal device may change the transfer interval by changing the transmission frame per second (FPS) of the virtual information, and may stop the transmission of the virtual information by changing the transfer interval to infinity. Alternatively, when the transmission of the virtual information is unnecessary, the terminal device may even stop the transmission of image-related data and metadata.

Figure 8A:
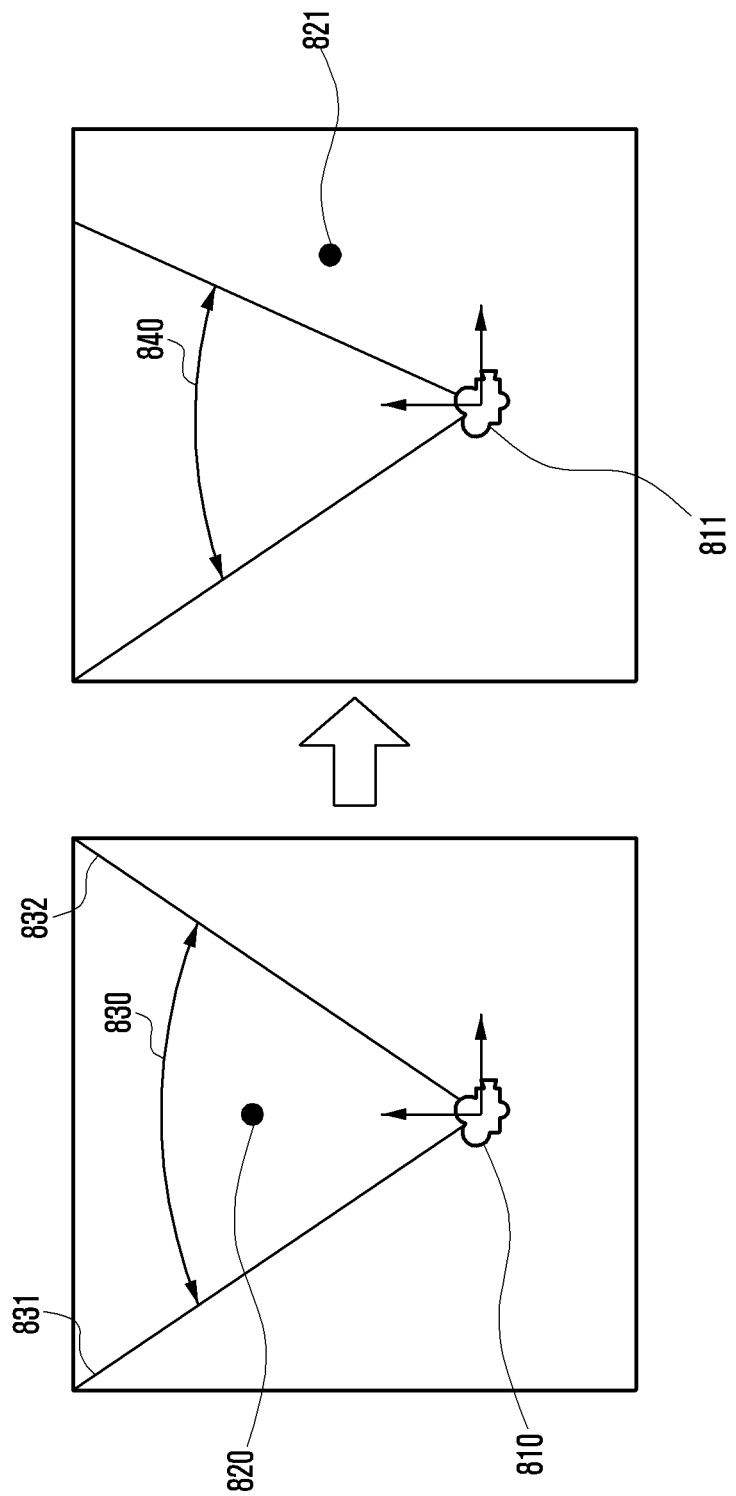
FIGS. 8A and 8B are diagrams illustrating an example viewing range of an AR device according to various embodiments.
Figure 8B:
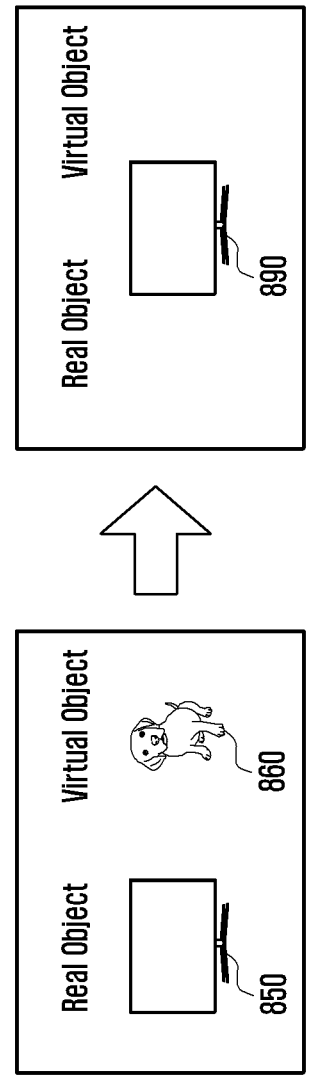

FIGS. 8A and 8B are diagrams illustrating an example viewing range of an AR device according to various embodiments.

With reference to FIG. 8A, the viewing range of the AR device may be a range that the user wearing the AR device (e.g., the AR device 420 in FIG. 4B) can recognize through the AR device. For example, the viewing range may be the field of view (FoV) of the AR device. A processor of a terminal device (e.g., the terminal device 410 in FIG. 4A) may identify the FoV of the AR device, based on image information received from the AR device and/or motion information of the AR device. According to various embodiments, the terminal device may perform modeling of a virtual space based on information received from the AR device, and may identify the FoV based on a virtual camera 810 in the virtual space. The terminal device may identify, as the FoV, a range 830 or 840 between a left gaze limit 831 and a right gaze limit 832 that can be recognized respectively to the maximum left and right at corresponding position and posture by the virtual camera 810 in the virtual space modeled using the motion information of the AR device. At this time, the terminal device may compare the location of the object 820 or 821 with the FoV 830 or 840 and thereby determine whether the object is outside the viewing range of the AR device. For example, when the object 820 is included in the FoV 830 of the camera 810 by being in the virtual space, the terminal device may determine that the object is not out of the viewing range, or when the object 821 is not included in the FoV 840 of the camera 810 being in the virtual space, the terminal device may determine that the object is out of the viewing range.

With reference to FIG. 8B, illustrates an embodiment in which the object is out of the viewing range. According to various embodiments, even when the object is located within the field of view (FoV), if the object and the virtual object overlap in positions or exist on the same line with respect to the user's gaze and thus one of them is obscured by the other, the overlapping or obscured object may be determined to be out of the viewing range. When a real object 850 and a virtual object 860 are not on the same line based on the user's gaze or the gaze of a camera in the virtual space (e.g., the camera 810 in the virtual space of FIG. 8A), the user can recognize both the real object and the virtual object through the AR device. In this case, each object may be determined to be included in the viewing range of the AR device. On the other hand, when the real object and the virtual object are on the same line and/or at the same position with respect to the user's gaze or the camera's gaze in the virtual space, among the real object and the virtual object that are overlapping each other, only an object 890 that is closer to the camera in the virtual space may be recognized. The terminal device may determine whether the object is out of the viewing range, based on location information and motion information of the AR device, location information of the object, and/or location information of the virtual object included in the virtual information.

Figure 9:
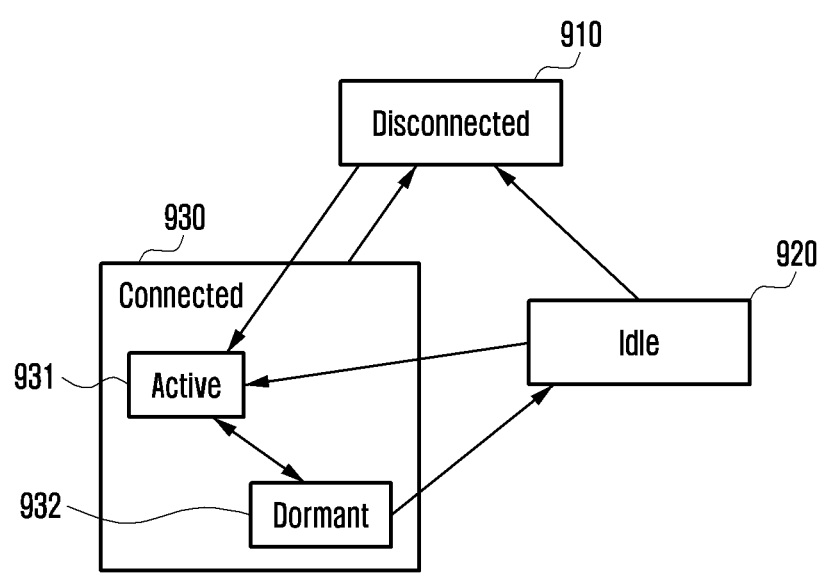
FIG. 9 is a diagram illustrating an example network connection state according to various embodiments.

FIG. 9 is a diagram illustrating an example network connection state according to various embodiments.

With reference to FIG. 9, a network connection state between a terminal device (e.g., the terminal device 310 in FIG. 3) and an AR device (e.g., the AR device 320 in FIG. 3) or a network connection state between the terminal device and a server (e.g., the server 330 in FIG. 3) are illustrated.

According to various embodiments, the network connection state between the terminal device and the AR device or the network connection state between the terminal device and the server device may have a disconnected state 910, an idle state 920, and a connected state 930. The disconnected state 910 may be a state in which communication connections between the terminal device and the AR device are released. In the disconnected state 910, the terminal device and the AR device may be in a state that there is no communication connection and no transmission/reception of information for providing an AR service. When a certain condition such as a user's request does not exist, the disconnected state 910 may be maintained. According to various embodiments, when there is a user's request, the disconnected state 910 may be switched to the connected state 930. The connected state 930 may include an active state 931 and a dormant state 932. When the terminal device and the AR device establish a connection with each other, the disconnected state 910 may be switched to the active state 931, and in the active state 931 the terminal device and the AR device may transmit/receive data such as image information, motion information of the AR device, and/or virtual information. The active state 931 may be a high power state, and may be a state in which a network connection is continued. According to various embodiments, the active state 931 may be a state in which all kinds of data transmitted/received by the terminal device and the AR device can be transmitted/received. For example, in this state, the control data 530, the image streaming 540, the transmission control 550, and the sensor data 560, shown in FIG. 5, may be continuously transmitted/received. According to various embodiments, the terminal device may switch from the active state 931 to the dormant state 932. When the object is out of the viewing range, the terminal device may lower the transfer interval of the virtual information and may even stop the transmission of the virtual information. In this case, the network connection state may be the dormant state 932. The dormant state 932 may be, for example, a state in which a physical connection is maintained between the terminal device and the AR device, but only a small amount of information can be transmitted. The dominant state 932 may be a low power state compared with the active state 931. According to various embodiments, the active state 931 and the dormant state 932 may be switched to each other, which is based on a condition for changing the transfer interval of the virtual information. After a certain time has elapsed from the dormant state 932, the network state may be switched to the idle state 920 when the transfer interval lowering condition continues. The idle state 920 may be a state in which the terminal device and the AR device are detecting only control traffic for establishing a connection with each other in a low power state. For example, in the idle state 920, the terminal device and the AR device may be in a state that a communication connection is released from each other. According to various embodiments, in the idle state 920, the terminal device and the AR device may store information about an existing connection to each other in a state that the physical connection is released, and when data transmission is required, the existing information may be used for switching back to the active state 931. According to various embodiments, when the idle state 920 is maintained for a certain time or more, or when there is an explicit connection release request, the idle state 920 may be switched back to the disconnected state 910.

An electronic device according to various example embodiments of the disclosure includes: a communication module comprising communication circuitry and a processor operatively connected to the communication module. The processor may control the communication module to communicatively connect to an augmented reality (AR) device, and configured to receive image information obtained by a camera of the AR device from the AR device, to detect an object based on the received image information, to acquire virtual information corresponding to the object, to control the communication module to transmit the virtual information to the AR device, to analyze the received image information to determine whether the detected object is out of a viewing range of the AR device, and to change a transfer interval of the virtual information for the AR device based on the determination.

In addition, the processor may be configured to not transmit the virtual information based on determining that the detected object is out of the viewing range of the AR device.

In addition, the processor may be configured to change the transfer interval of the virtual information for the AR device by lowering a transmission frame per second (FPS) of the virtual information based on determining that the object is out of the viewing range of the AR device.

In addition, the processor may be configured to determine that the object is out of the viewing range of the AR device, based on the object not being identified in the image information received in real time.

In addition, the virtual information may include a two-dimensional image, and the processor may be configured to control the communication module to transmit the two-dimensional image to the AR device.

In addition, the processor may be configured to determine whether the object is out of the viewing range of the AR device, based on location information of the two-dimensional image corresponding to the image information, and to change the transfer interval of the virtual information for the AR device based on the determination.

In addition, the processor may be configured to compare the location information of the two-dimensional image and a field of view (FOV) of the AR device and determine whether the two-dimensional image is out of the viewing range of the AR device.

In addition, the processor may be configured to compare location information of the object and the location information of the two-dimensional image and determine, based on whether the two-dimensional image is obscured by the object, whether the two-dimensional image is out of the viewing range of the AR device.

In addition, the processor may be configured to receive motion information of the AR device from the AR device, and to change, in response to identifying that a motion level of the AR device is less than or equal to a specified level, the transfer interval of the virtual information based on at least one of the image information or the motion information.

In addition, the communication module may support at least one short-range wireless communication of Wi-Fi P2P, Bluetooth, and Bluetooth low energy (BLE), and the processor may be configured to be connected to the AR device using the at least one short-range wireless communication, receive the image information, and transmit the virtual information.

In addition, the processor may be configured to control the communication module to receive the virtual information from an external server device and transmit the virtual information to the AR device.

In addition, the processor may be configured to switch a communication connection state with the communicatively connected AR device to a dormant state based on changing the transfer interval of the virtual information.

An electronic device according to various example embodiments of the disclosure includes a communication module comprising communication circuitry, a camera, and a processor operatively connected to the communication module. The processor may be configured to acquire image information using the camera, to control the communication module to transmit the image information to a terminal device, to control the communication module to receive virtual information acquired by the terminal device from the terminal device, and to change a transfer interval of the image information, based on a reception interval of virtual information received from the terminal device.

In addition, the processor may be configured to lower a transmission frame per second (FPS) of the image information based on the reception interval of the virtual information being lowered.

In addition, the electronic device may further include a sensor, and the processor may be configured to acquire motion information of the electronic device using the sensor, to control the communication module to transmit the motion information to the terminal device, and to change a transfer interval of the motion information, based on the reception interval of the virtual information.

A method for changing a transfer interval of virtual information for an augmented reality (AR) device at an electronic device according to various example embodiments of the disclosure may include: receiving image information from the AR device, detecting an object based on the received image information, acquiring virtual information corresponding to the object, transmitting the virtual information to the AR device, analyzing the received image information to determine whether the object is out of a viewing range of the AR device, and changing a transfer interval of the virtual information for the AR device based on the determination.

In addition, the determination may include determining that the object is out of the viewing range of the AR device, based on the object not being identified in the image information received in real time.

In addition, the method may include transmitting a two-dimensional image including the virtual information, determining whether the object is out of the viewing range of the AR device, based on location information of the two-dimensional image, and changing the transfer interval of the virtual information for the AR device based on the determination.

In addition, the method may include receiving motion information of the AR device, and changing the transfer interval of the virtual information based on a motion level of the AR device being less than or equal to a predetermined level, based on at least one of the image information or the motion information.

In addition, the method may include receiving the virtual information from an external server device and transmitting the virtual information to the AR device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
 a communication module comprising communication circuitry; and
 a processor operatively connected to the communication module,
 wherein the processor is configured to:
  control the communication module to communicatively connect to an augmented reality (AR) device,
  receive image information obtained by a camera of the AR device from the AR device continuously,
  receive motion information of the AR device from the AR device,
  detect objects based on the received image information,
  acquire virtual information corresponding to at least one of the detected objects,
  control the communication module to transmit the virtual information to the AR device,
  analyze image information received in real time from the AR device to determine whether an object corresponding to the virtual information is out of a viewing range of the AR device, and change, in response to identifying that a motion level of the AR device is less than or equal to a specified level, a transfer interval of the virtual information for the AR device based on at least one of the determination or the motion information.

2. The electronic device of claim 1, wherein the processor is configured to not transmit the virtual information based on determining the detected object corresponding to the virtual information is out of the viewing range of the AR device.

3. The electronic device of claim 1, wherein the processor is configured to change the transfer interval of the virtual information for the AR device by lowering a transmission frame per second (FPS) of the virtual information based on determining that the object corresponding to the virtual information is out of the viewing range of the AR device.

4. The electronic device of claim 1, wherein the processor is configured to determine that the object corresponding to the virtual information is out of the viewing range of the AR device, based on the object corresponding to the virtual information not being identified in the image information received in real time.

5. The electronic device of claim 1, wherein the virtual information includes a two-dimensional image, and
wherein the processor is configured to control the communication module to transmit the two-dimensional image to the AR device.

6. The electronic device of claim 5, wherein the processor is configured to:
determine whether the object corresponding to the virtual information is out of the viewing range of the AR device, based on location information of the two-dimensional image corresponding to the image information, and
change the transfer interval of the virtual information for the AR device based on the determination.

7. The electronic device of claim 6, wherein the processor is configured to compare the location information of the two-dimensional image and a field of view (FOV) of the AR device and determine whether the two-dimensional image is out of the viewing range of the AR device.

8. The electronic device of claim 6, wherein the processor is configured to compare location information of the detected objects and the location information of the two-dimensional image and determine, based on whether the two-dimensional image is obscured by at least one of the detected objects, whether the two-dimensional image is out of the viewing range of the AR device.

9. The electronic device of claim 1, wherein the communication module is configured to support at least one short-range wireless communication of Wi-Fi P2P, Bluetooth, and Bluetooth low energy (BLE), and
wherein the processor is configured to be connected to the AR device using the at least one short-range wireless communication, receive the image information, and transmit the virtual information by controlling the communication module.

10. The electronic device of claim 1, wherein the processor is configured to control the communication module to receive the virtual information from an external server device and transmit the virtual information to the AR device.

11. The electronic device of claim 1, wherein the processor is configured to switch a communication connection state with the communicatively connected AR device to a dormant state based on changing the transfer interval of the virtual information.

12. A system comprising the electronic device of claim 1 and the AR device, wherein the AR device comprises:
at least one communication module comprising communication circuitry;
at least one processor operatively connected to the at least one communication module,
wherein the at least one processor is configured to:
acquire image information using the camera,
control the at least one communication module to transmit the image information to a electronic device,
control the at least one communication module to receive virtual information acquired by the electronic device from the electronic device, and
change a transfer interval of the image information, based on a reception interval of virtual information received from the electronic device.

13. The system of claim 12, wherein the at least one processor is configured to lower a transmission frame per second (FPS) of the image information based on the reception interval of the virtual information being lowered.

14. The system of claim 12, wherein the AR device further comprises:
a sensor,
wherein the at least one processor is configured to:
acquire motion information of the electronic device using the sensor,
control the at least one communication module to transmit the motion information to the electronic device, and
change a transfer interval of the motion information, based on the reception interval of the virtual information.

15. A method for changing a transfer interval of virtual information for an augmented reality (AR) device at an electronic device, the method comprising:
receiving image information from the AR device continuously;
receiving motion information of the AR device;
detecting objects based on the received image information;
acquiring virtual information corresponding to at least one of the detected object;
transmitting the virtual information to the AR device;
analyzing image information received in real time from the AR device, to determine whether the an object corresponding to the virtual information is out of a viewing range of the AR device; and
changing, in response to identifying that a motion level of the AR device is less than or equal to a specified level, the transfer interval of the virtual information based on at least one of the determination or the motion information.

16. The method of claim 15, wherein the determination includes determining that the object corresponding to the virtual information is out of the viewing range of the AR device, based on the object corresponding to the virtual information not being identified in the image information received in real time.

17. The method of claim 15, further comprising:
transmitting a two-dimensional image including the virtual information;
determining whether the object corresponding to the virtual information is out of the viewing range of the AR device, based on location information of the two-dimensional image; and
changing the transfer interval of the virtual information for the AR device based on the determination.

18. The method of claim 15, comprising:
receiving the virtual information from an external server device and transmitting the virtual information to the AR device.

* * * * *